R. W. BUMSTEAD.
STOCK QUOTATION INDICATOR.
APPLICATION FILED JUNE 22, 1905.
1,114,578.
Patented Oct. 20, 1914.
5 SHEETS—SHEET 4.
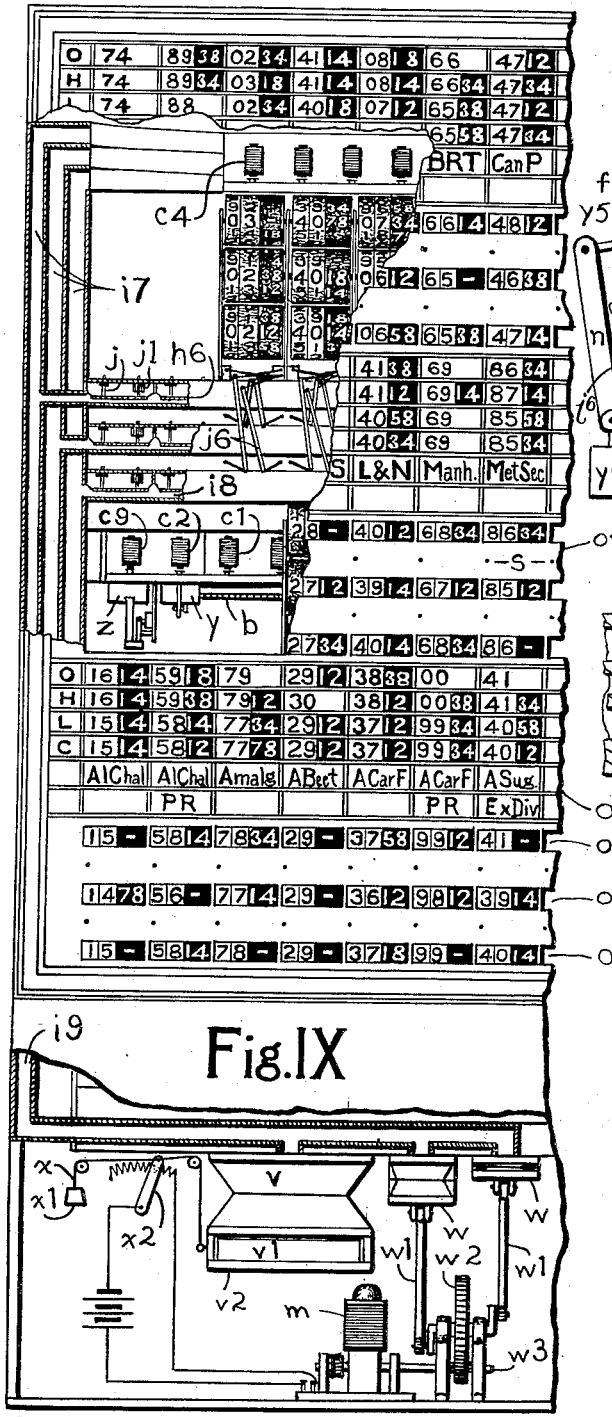
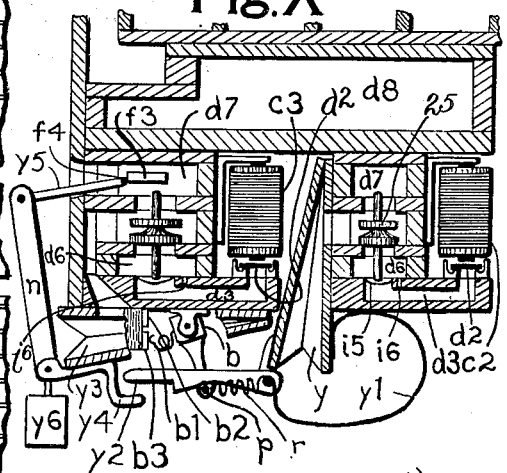
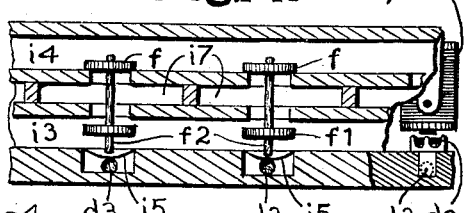
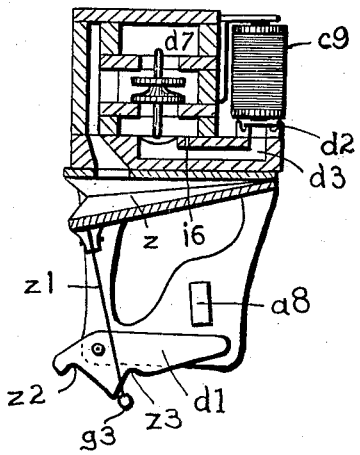
WITNESSES
S. Wm. Lutton
A. W. Knapp
INVENTOR
Ralph Willis Bumstead
BY Lemsey & Gregory
ATTY'S

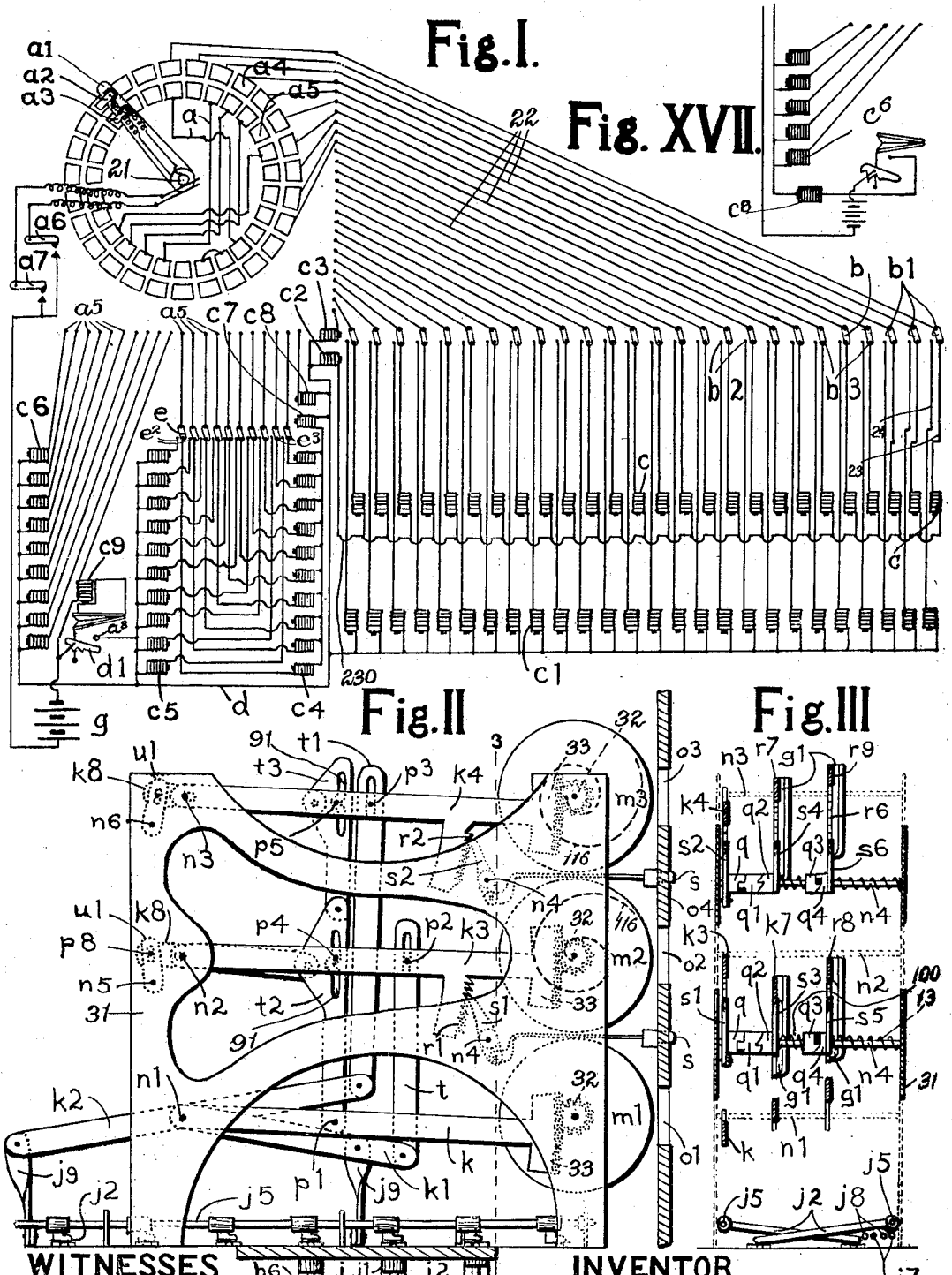

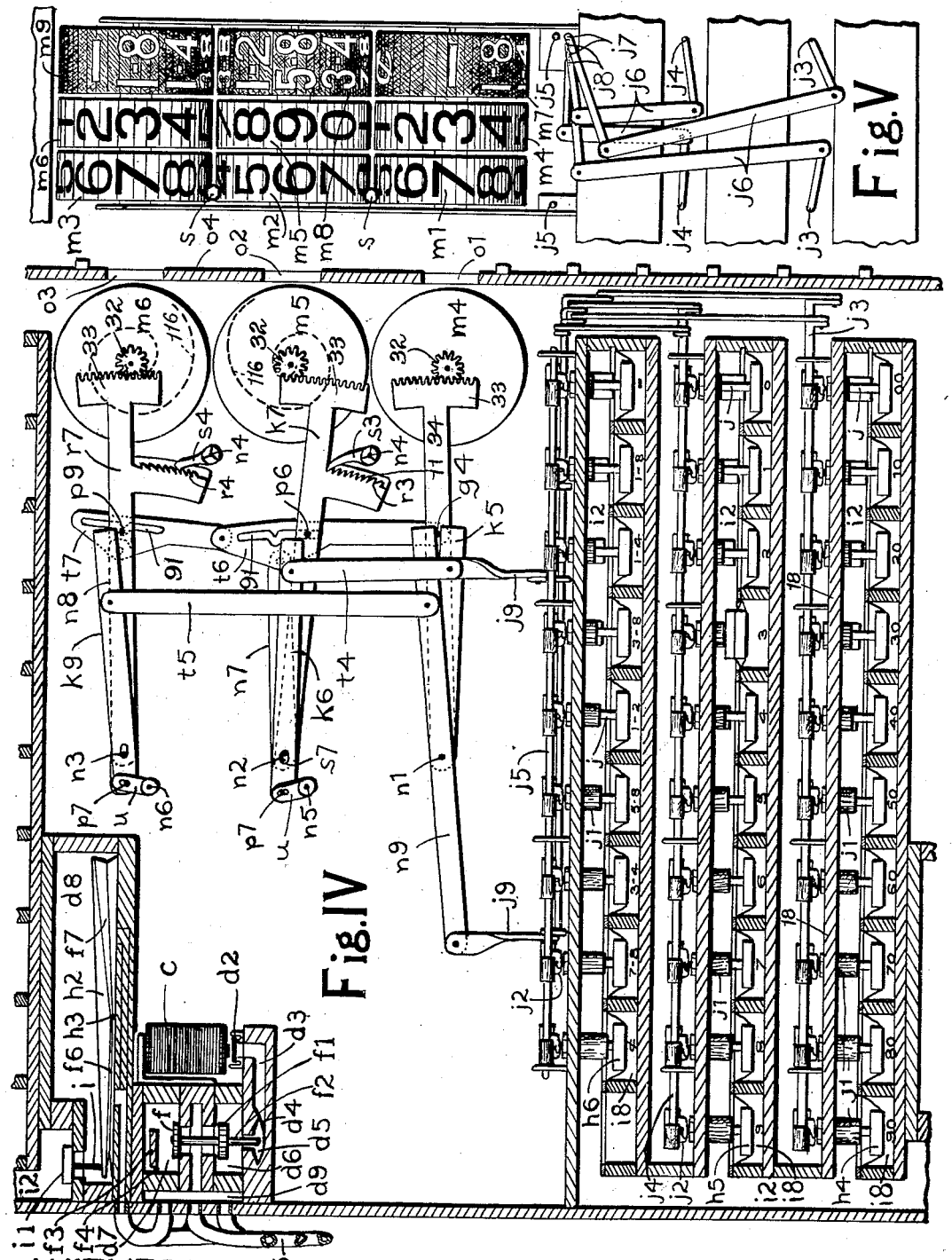

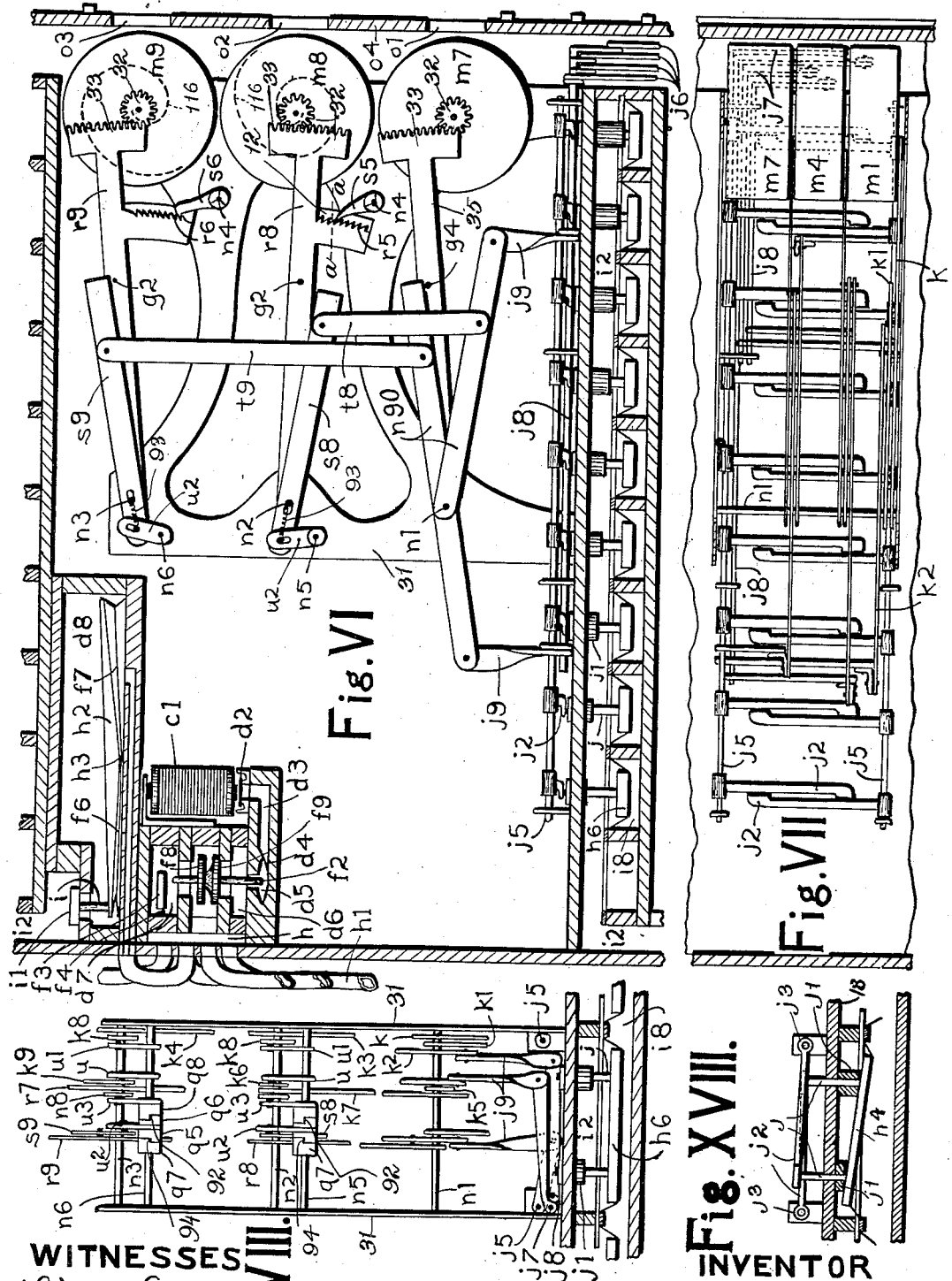

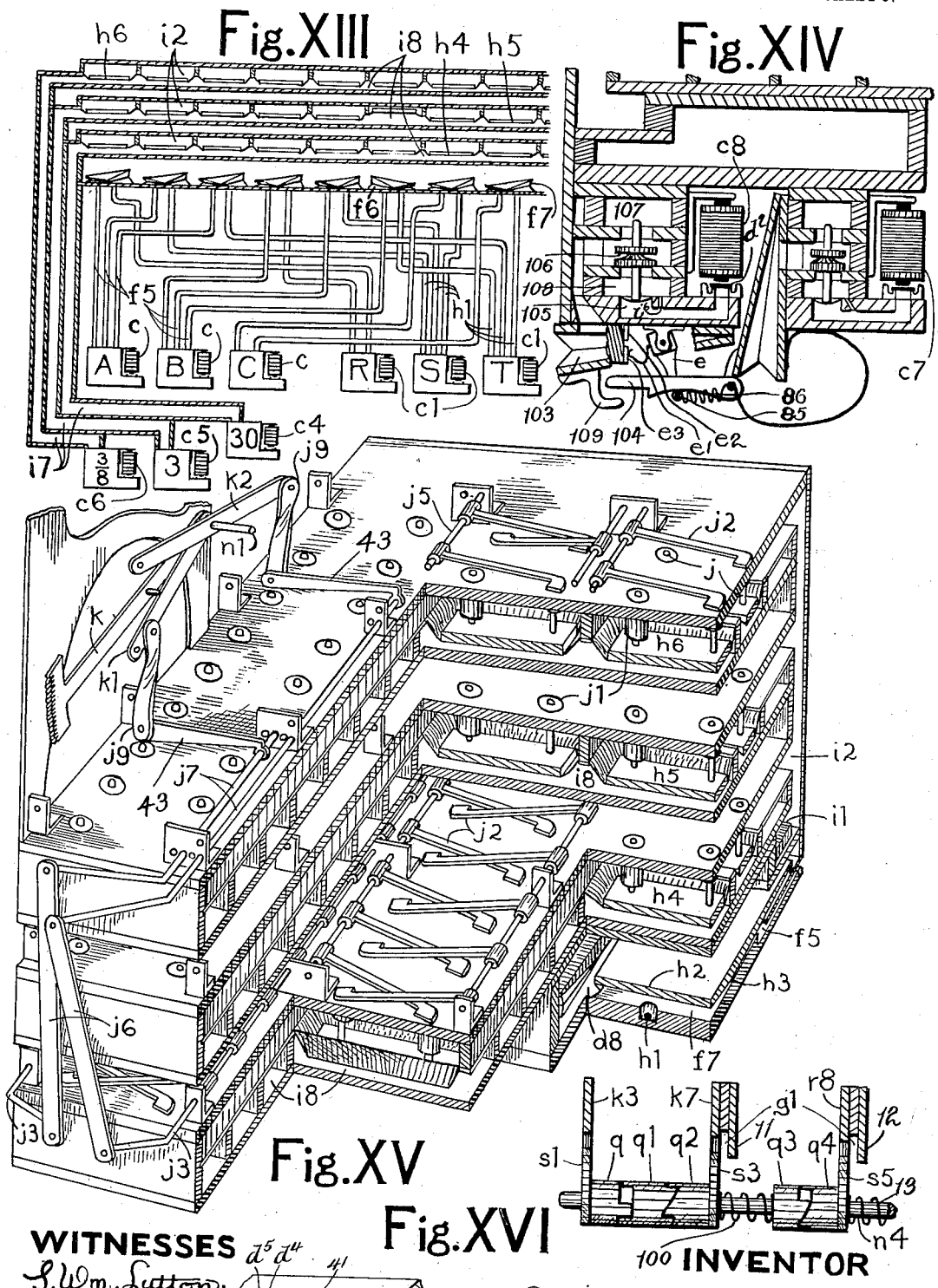

UNITED STATES PATENT OFFICE.

RALPH W. BUMSTEAD, OF BOSTON, MASSACHUSETTS.

STOCK-QUOTATION INDICATOR.

1,114,578.   Specification of Letters Patent.   Patented Oct. 20, 1914.

Application filed June 22, 1905. Serial No. 266,437.

*To all whom it may concern:*

Be it known that I, RALPH W. BUMSTEAD, a citizen of the United States, residing at Boston, county of Suffolk, and State of Massachusetts, have invented an Improvement in Stock-Quotation Indicators, of which the following description, in connection with the accompanying drawings, is a specification, like letters on the drawings representing like parts.

This invention relates to indicators for stock quotations, and its has for its object to provide a device of this character which is automatically operated through the medium of an intelligence-transmitting instrumentality, such, for instance, as a printing telegraph instrument, and which is capable of exhibiting not only a market quotation for each of a plurality of stocks or securities, but also a minimum and a maximum quotation for each security.

My improved device comprises an indicator mechanism for each security, such indicator mechanism being preferably constructed to indicate not only the market quotations, but also the maximum and minimum quotations, a pneumatic operating or controlling device for each indicator, and a selecting mechanism, preferably operated from a printing telegraph and arranged first to select and render operative the indicating mechanism of the security which it is desired to quote, and then to render operative the indicator-operating mechanism of said security, whereby said indicator is operated to indicate the price at which said security has been sold. These various mechanisms are all operated automatically from the intelligence-transmitting instrumentality, and the result is that with an indicator embodying my invention in a broker's office, the prices at which the various securities are being sold on the stock exchange will be automatically exhibited as fast as the sales are recorded on the printing telegraph.

In the accompanying drawings, Figure I is a diagrammatic view of the circuits of the electric part of the selecting mechanism by which the printing telegraph operates to select and render operative the indicator mechanism for any desired security; Fig. II is a side view of the tens-wheels of the indicator for any security; Fig. III is a section on substantially the line 3—3, Fig. II; Fig. IV is a side view similar to Fig. II of the mechanism for setting the units-wheels of the indicator mechanism, said view also showing a section through the pneumatic indicator-operating mechanism; Fig. V is a front view of the indicator wheels, said view also showing a portion of the indicator-operating mechanism; Fig. VI is a view similar to Fig. IV showing the means for setting the fractions-wheels of the indicator mechanism; Fig. VII is a plan view of Fig. VI, the pneumatic mechanism at the upper left-hand border of Fig. VI being omitted; Fig. VIII is a rear view of the means for setting the indicator wheels; Fig. IX shows the front view of a portion of a stock-board, part of said figure being broken out to better show the interior construction; Figs. X and XI are details of the selecting mechanism hereinafter referred to; Fig. XII is a transverse section of a mechanism for temporarily disconnecting the stock-boards from their "tickers" during the transmission of matter for the tape other than the ordinary quotations; Fig. XIII is a diagram of a portion of the selecting mechanism; Fig. XIV is a further detail of the selecting mechanism; Fig. XV is a perspective view partly in section showing the operation of the indicator-operating mechanism; Fig. XVI is a section on substantially the line *a*—*a*, Fig. VI; Fig. XVII is a detail of a portion of the mechanism shown in Fig. I illustrating a modified arrangement of the wiring; Fig. XVIII is a detail of a portion of the mechanism shown in Fig. VIII. Fig. XIX shows a detail of construction hereinafter referred to.

In describing my invention, I will first describe the indicating mechanism which I preferably employ, and will thereafter describe the operating mechanism therefor and the means for selecting the indicating mechanism of the particular security it is desired to quote.

*Indicating mechanism.*—I would state at the outset that I propose to employ as many indicator mechanisms as there are securities to be quoted or indicated, and the indicator mechanism for any one security is entirely independent from the indicator mechanism for any other security, although, as will be presently described, the indicator mechanism for each security is operated from the same printing telegraph instrument or its equivalent.

I prefer to use price wheels for the indicators, and one wheel is adapted to indicate the tens figure of the quotation designated, another wheel is adapted to indicate the units figure and a third wheel is adapted to indicate the fractions. I could, if desired, also employ another wheel to indicate the hundreds figure of the quotation, but as this would be likely to unduly complicate the structure, I propose to omit the hundreds wheel and rely upon the observer's general knowledge of the stocks quoted to tell him whether the price indicated by the wheels is 140, for instance, or 40.

The tens-wheel and units-wheel of the indicator for each security are marked on their peripheries with the figures: 0, 1, 2, 3, 4, 5, 6, 7, 8, 9; and the fractions-wheel for each security is marked: -, $\tfrac{1}{8}$, $\tfrac{1}{4}$, $\tfrac{3}{8}$, $\tfrac{1}{2}$, $\tfrac{5}{8}$, $\tfrac{3}{4}$, $\tfrac{7}{8}$, $\phi$.

In the drawings (see Figs. II and V) wheels $m'$, $m^4$ and $m^7$ designate the tens-wheel, units-wheel and fractions-wheel, respectively, of one security, these wheels being those that are adapted to indicate the market quotation of any security. The said wheels are arranged side by side, as shown in Fig. V, and in practice will be arranged behind a board or partition $o^4$ which has an opening $o'$ therein (see Figs. IV and IX) through which a portion of the periphery of each wheel is visible. As fast as any security is sold, the printing telegraph sets in operation the selecting mechanism and indicator-operating mechanism, presently to be described, and they operate to turn the wheels $m'$, $m^4$ and $m^7$ for the selected security so that said wheels will indicate the price at which the security was last sold, or as I have termed it, the "market quotation" for said security. In addition to this set of wheels $m'$, $m^4$ and $m^7$ for indicating the market quotation of each security, the indicator mechanism for each security also has a set of wheels $m^2$, $m^5$ and $m^8$ (see Figs. II, IV, V and VI) for indicating the minimum price at which said security has been sold during the day, and another set of indicating wheels $m^3$, $m^6$ and $m^9$ for indicating the maximum price at which said security has been sold during the day.

Each set of wheels for indicating the maximum or minimum quotation contains a tens-wheel, a units-wheel and a fractions-wheel similar to the set which indicates the market quotations. The wheels for indicating the minimum and maximum quotations are also arranged behind the board $o^4$, the wheels $m^2$, $m^5$ and $m^8$ for the minimum quotation being visible through an opening $o^2$ in said board, and the figures on the wheels for indicating the maximum quotation being displayed through an opening $o^3$ in said board. All of these price wheels are supported on suitable shafts mounted in a frame 31. Each of the wheels in each set of wheels has fast therewith a pinion 32 which gears with a rack 33 on the end of an actuating-lever.

The actuating-lever for the tens-wheel of the market quotation is designated $k$; that for the tens-wheel of the minimum quotation being designated $k^3$, and that for the tens-wheel of the maximum quotation being designated $k^4$.

The actuating-levers for the units-wheels of the market, minimum and maximum quotations are designated 34, $k^7$ and $r^7$, respectively, and the actuating-levers for the fractions-wheels for the market, minimum and maximum quotations are designated 35, $r^8$ and $r^9$, respectively.

The actuating-levers $k$, 34 and 35 for the wheels for the market quotation are actuated directly by the indicator-operating mechanism, hereinafter described, and the actuating-levers for the wheels for indicating the minimum and maximum quotations are actuated from the actuating-levers for the wheels indicating the market quotations.

Referring first to Fig. II, it will be seen that the actuating-lever $k$ is pivoted to the frame 31 at $n'$ and has projecting therefrom a pin $p'$. Pivoted to the rod $n'$ are controlling-levers $k'$ and $k^2$ which are actuated directly from the indicator-operating mechanism presently to be described. When the right-hand end of these levers shut toward each other, they grip between them the pin $p'$, and the position of the actuating-lever $k$ is therefore determined by the final position in which the two levers $k'$, $k^2$ are placed by the indicator-operating mechanism. For instance, if the wheel $m'$ is to indicate the figure 1, the lever $k'$ will be moved upwardly considerably more than the lever $k^2$ is moved downwardly, and the actuating-lever $k$ will be elevated from the position shown in Fig. II. On the other hand, if figure 7 is to be indicated, the right-hand end of lever $k^2$ will be moved downwardly more than lever $k'$ is moved upwardly, and the actuating-lever will assume the position shown in Fig. II. In all cases the setting movement of the right-hand end of the lever $k^2$ is downward, starting from its highest position, and the setting movement of the lever $k'$ is upward starting from its lowest position.

The mechanism for moving the actuating-lever 34 for the units-wheel $m^4$ for the market quotation is similar to that above described, that is, it comprises two controlling-levers $k^5$, $n^9$, suitably pivoted on the cross-rod $n'$ and actuated by the indicator-operating mechanism, hereinafter to be described, and adapted to grip between them as they move toward each other a pin $g^4$ projecting from the actuating-lever 34. A similar mechanism is also used for operating the fractions-wheel $m^7$ for the market quotation, said mechanism comprising two controlling-levers $n^{90}$ (see Fig. VI) which are also suitably pivoted on a cross-rod $n'$, and are adapted to grip between them a pin $g^4$ projecting from the actuating-lever 35. The position of the controlling levers $n^{90}$ for the fractions-wheel $m^7$ and that of the controlling levers $n^9$ and $k^5$ for the units wheel $m^4$ for each indication is governed by the indicator-actuating mechanism, and said controlling levers operate on the pins $g^4$, as above described, to actuate the indicating wheels $m^4$, $m^7$. The above-described mechanism is that which operates to set the price wheels for the market quotation.

The means for controlling the price wheels for the maximum and minimum quotations will now be described, and first, I will describe the connections for operating the tens-wheels $m^2$ and $m^3$. Pivoted to the actuating-lever $k'$ is a slotted link $t$ through the slot of which plays a pin $p^2$ extended from the actuating-lever $k^3$ for the tens-wheel $m^2$, and pivoted to the controlling-lever $k^2$ is a slotted link $t'$ through the slot of which plays a pin $p^3$ extended from the actuating-lever $k^4$ of the tens-wheel $m^3$. Whenever the controlling-lever $k^2$ is actuated to cause operation of the market quotation wheel $m'$, the link $t'$ will be drawn downwardly, and if the quotation to be indicated by wheel $m'$ is higher than that which has been previously registered, the movement of said lever $k^2$ will be greater than any previous movement thereof, and consequently the end of the slot in the link $t'$ will engage the pin $p^3$ and move the actuating-lever $k^4$ downwardly, thereby turning the maximum tens-wheel $m^3$ to indicate the tens figure of the new maximum quotation. Said actuating-lever is held in this position by a pawl $s^2$ adapted to engage a ratchet $r^2$ rigid with the actuating-lever $k^4$. Similarly if the quotation which is to be registered by the wheel $m'$ is less than any which has been previously registered, the lever $k'$ will, in order to properly turn the wheel $m'$, have an upward movement, and through the link $t$ and pin $p^2$, the actuating-lever $k^3$ will be operated, thereby turning the tens-wheel $m^2$ for the minimum quotation into position to indicate the tens figure of the new minimum quotation. Said wheel is held in its newly adjusted position by a suitable pawl $s'$ pivoted at $n^4$ and adapted to engage a ratchet $r'$ rigid with the actuating-lever $k^3$. The pawls $s'$ and $s^2$ may be released when desired by means of suitable push-rods $s$ which extend through the front of the board. When the pawl $s'$ is released, the wheel $m^2$ is rotated by a spring 116 until the figure "9" comes into view, this spring being secured at one end to the stationary shaft upon which the wheel $m^2$ is mounted, and at the other end to the inner side of the periphery of said wheel. When the pawl $s^2$ is released the wheel $m^3$ is rotated by a similar spring 116 until the figure "0" comes into view. Likewise, other springs 116 within the other wheels of the maximum and minimum indicators serve the same purpose of restoring them to their starting positions when released by their respective pawls.

Whenever either the minimum or maximum tens-wheel is moved to indicate a new tens digit it will obviously be necessary to upset the minimum or maximum units-wheel so that a new start may be made with said units-wheels on the basis of the new tens figure, and similarly whenever the minimum or maximum units-wheel is turned to indicate a new units digit it will be necessary to upset the registration of the minimum or maximum fractions-wheel. The mechanism for accomplishing this will now be described.

The pawl $s'$ for holding the actuating lever $k^3$ for the minimum tens-wheels in its adjusted position, has rigid therewith a clutch-member $q$ which coöperates with another clutch-member $q'$ fast to the shaft $n^4$ extending between the sides of the frame 31 (see Figs. III and XVI). The engaging projections of the clutch-members $q$, $q'$, are square, as shown in Fig. XVI, so that said clutch-members rotate in unison. The right hand side of clutch-member $q'$ (Fig. III) has an inclined surface which engages corresponding inclined surfaces on a hub $q^2$ rigid with the pawl $s^3$ for holding in its adjusted position the actuating-lever $k^7$ for the minimum units-wheel $m^5$. A suitable spring 100 serves to hold these clutch-members in engagement with each other. Adjacent the ratchet $r^3$ (see Figs. III and IV) is a guard 11 and between said guard and ratchet is a groove $g'$. When the tens-wheel $m^2$ is moved to shift the tens figure, the turning movement of the pawl $s'$, caused by clicking over a tooth of the ratchet $r'$, turns the clutch-member $q'$ and the cam-surface on said member $q'$ throws the pawl $s^3$ to the right, Figs. III and XVI, and into the groove $g'$ out of engagement with the ratchet $r^3$, thereby upsetting the registration of the minimum units-wheel.

The upsetting of the registration of the minimum fractions-wheel is accomplished by a similar device. Fast to the shaft $n^4$ is another cam member $q^3$ adapted to coöperate with the hub $q^4$ of the pawl $s^5$ for locking the minimum fractions-wheel in its adjusted position, and adjacent the ratchet $r^5$ is a guard-flange 12 between which and said rack is a groove $g'$. The turning of the shaft $n^4$ either by the pawl $s'$ or the pawl $s^3$ and clutch-member $q'$ operates through the cam-members $q^3$, $q^4$, to move the pawl $s^5$ to the right (Figs. III and XVI) thereby disengaging it from the ratchet $r^5$. The pawl $s^5$ is normally held in its operative position by a suitable spring 13. It will thus be seen that whenever the minimum tens-wheel $m^2$ is moved, the registration of the minimum units and fractions-wheels is upset, so that said units and fractions wheels may be readily reset on the basis of the new tens figure, and that whenever the minimum units wheel $m^5$ is moved the registration of the minimum fractions-wheel $m^8$ is upset so that said wheel $m^8$ may be readily reset on the basis of the new units figure. The same construction is employed for disengaging the pawls $s^4$ and $s^6$ for holding the maximum units and fractions-wheels in their adjusted position whenever the maximum tens-wheel $m^3$ is moved to designate a new figure, and likewise for disengaging the pawl $s^6$ whenever the maximum units-wheel $m^6$ is moved to designate a new figure.

The upsetting of the registration of the maximum units wheel throws the figure "0" into view so that whatever the new units figure may be in the market quotation, the maximum wheel $m^6$ may be turned from "0" to the corresponding figure by a downward movement of the lever $k^9$ which starts always from its uppermost position above the pin $p^9$. Similarly, the upsetting of the minimum units wheel $m^5$ throws the figure "9" into view so that whatever the new units figure may be in the market quotation, the minimum wheel $m^5$ may be turned from "9" to the corresponding figure by an upward movement of the lever $k^6$ which starts always from its lowest position beneath the pin $p^6$. Similarly, the maximum and minimum fractions wheels upon being upset are restored to zero position so that whatever fraction may be indicated in the market quotation, the corresponding fraction may be brought into view for the maximum quotation by a downward movement of lever $s^9$ and for the minimum quotation by an upward movement of the lever $s^8$.

The mechanism for driving the minimum and maximum units and fractions wheels $m^5$, $m^8$, $m^6$, $m^9$, respectively, will now be described. After a maximum quotation of say 73⅛ has been registered, it will be necessary to disconnect the units and fractions wheels $m^6$ and $m^9$ whenever quotations below 70 are registered, and to disconnect the fractions wheel $m^9$ whenever quotations under 73 are registered. Likewise after a minimum quotation of 69⅜ has been registered by the minimum quotation wheels $m^2$, $m^5$, $m^8$, the setting mechanism for the units and fractions wheels $m^5$, $m^8$ must not be interfered with by the setting mechanism for the units and fractions wheels of the market quotation set during the quotation of any price above 69⅜. Accordingly I have provided a mechanism by which the units and fractions wheels for the minimum quotation are connected to the setting device for the units and fractions wheels for the market quotations only when the latter are set to indicate a quotation lower than the previous minimum quotation, and other mechanism by which the units and fractions wheels for the maximum quotation are connected to the setting devices for the units and fractions wheels of the market quotation only when said market quotation wheels are set to indicate a quotation greater than the previous maximum quotation. The mechanism for accomplishing this object is as follows: Pivoted to the lever $k^5$ is a link $t^4$ connecting with another controlling lever $k^6$ which is adapted to coöperate with a pin $p^6$ projecting from the actuating lever $k^7$ for the minimum units wheel to operate the latter, and connected to the controlling lever $n^9$ is a link $t^5$ which connects with another controlling lever $k^9$ for operating the actuating lever $r^7$. The controlling levers $k^7$ and $r^7$ are pivoted on cross rods $n^2$ and $n^3$ both carried by the frame 31, and the controlling levers $k^6$ and $k^9$ are slotted at $s^7$ and are mounted to turn about the fulcrum rods $n^2$ and $n^3$ on which the actuating levers $k^7$ and $r^7$ are pivoted. Said controlling levers $k^6$, $k^9$ also have a pin-and-slot connection with arms $u$ fast to shafts $n^5$ and $n^6$, said shafts being mounted to turn in the frame 31. The shaft $n^5$ also has rigid therewith an arm $u'$ (see Fig. II) which is pivotally connected by a link $k^8$ to a pattern lever $t^2$ which is pivoted to the actuating lever $k$ at $p'$. Said pattern lever has a cam slot 91 therein in which plays a pin $p^4$ projecting from the actuating lever $k^3$.

$t^3$ designates another pattern lever pivoted to the pattern lever $t^2$, and also having a cam slot 91 therein adapted to receive a pin $p^5$ projecting from the actuating lever $k^4$. Said pattern lever $t^3$ is connected by a suitable link $k^8$ with an arm $u'$ fast on the shaft $n^6$. The shape of the slot 91 in the pattern lever $t^2$ is such that when the two actuating levers $k$ and $k^3$ are parallel (that is, when the two tens-wheels $m'$ and $m^2$ indicate the same figure), the pin $p^4$ occupies the curved portion of the slot, and the link $k^8$ is thereby projected toward the right Fig. II, thereby turning the shaft $n^5$. This operation projects the controlling lever $k^6$, Fig. IV, forwardly into position to engage the pin $p^6$ in the actuating lever $k^7$, and if when the parts are in this position, the actuating lever 34 is moved to indicate a figure less than that previously indicated, the engagement of the controlling lever $k^6$ with the pin $p^6$ will actuate the minimum units wheel $m^5$, as will be obvious, thus making said wheel register with the quotation indicated by the market units-wheel $m^4$.

The units-wheel for the minimum quotation is held in its adjusted position by a pawl $s^3$ engaging a ratchet $r^3$ rigid with the actuating lever $k^7$. At all times when the arms $k$ and $k^3$ are not parallel (that is, when the tens-wheels for the market and minimum quotations indicate different figures), the pin $p^4$ will occupy the straight portion of the slot 91, and consequently the controlling lever $k^6$ will be withdrawn from engagement with the pin $p^6$, as shown in Fig. IV.

From the above, it will be seen that so long as the tens-wheel for the market quotation is indicating prices greater than the lowest price at which the security has previously sold, or that indicated by the minimum wheel $m^2$, the pin $p^4$ will occupy the straight portion of the slot 91, and the controlling lever $k^6$ will be disengaged from the pin $p^6$. Similarly, the controlling lever $k^9$ is held in parallelism with the controlling lever $n^9$ (see Fig. IV) by means of a link $t^5$, and the pattern lever $t^3$ controls the position of the controlling lever $k^9$ relative to the pin $p^9$ in a manner similar to that in which the pattern lever $t^2$ controls the position of the controlling lever $k^6$. So long, therefore, as the maximum tens-wheel $m^3$ indicates a price larger than the tens-wheel $m'$, the pin $p^5$ will remain in the straight portion of the slot 91 in the pattern lever $t^3$, and the controlling lever $k^9$ will be thrown out of engagement with the pin $p^9$. If, however, the tens-wheel $m'$ is thrown to indicate the same figure as that indicated by the maximum tens-wheel $m^3$ or a greater figure, the pin $p^5$ comes into the curved portion of the slot 91 (as shown in Fig. II), thereby throwing the controlling lever $k^9$ forwardly (Fig. IV) into engagement with the pin $p^9$, and therefore the actuating lever $r^7$ will be moved downwardly in unison with the actuating lever 34, so that the maximum units-wheel will be brought to register the same figure that the market units-wheel does. A similar mechanism is used to disconnect and connect the minimum and maximum fractions wheels $m^8$ and $m^9$. The mechanism for connecting and disconnecting the minimum fractions wheel comprises a pattern lever $t^6$ pivoted to the actuating lever 34 (see Fig. IV), and having a cam slot therein in which plays the pin $p^6$ on the actuating lever $k^7$. Connected to the pattern lever $t^6$ is a link $n^7$ connected to an arm $u^3$ which is loose on the rod $n^5$, and has rigid therewith a hub provided with a stop shoulder 92 (see Fig. VIII) which abuts against a corresponding shoulder on the hub of an arm $u^2$ also loosely mounted on the rod $n^5$. Said arm $u^2$ has connected thereto a controlling lever $s^8$ for coöperating with a pin $q^2$ projecting from the actuating lever $r^3$ (see Fig. VI). A spring 93 acting upon the arm $u^2$ tends normally to keep the shoulder thereon against the stop shoulder 92. The lever $s^8$ is connected to one of the controlling levers $n^{90}$ by a link $t^8$.

With this mechanism it will be seen that whenever the market units-wheel is set to display a number equal to or lower than that already indicated by the minimum units-wheel $m^5$ the pattern lever $t^6$ will rock the arm $u^3$ on the shaft $n^5$ thus separating the stop shoulder 92 on the hub of said arm from the corresponding shoulder on the hub of the arm $u^2$, the spring 93 then coming into play and projecting the controlling lever $s^8$ forwardly into engagement with the pin $q^2$ (see Fig. VI) with the result that the minimum fractions-wheel $m^8$ is operated by the movement of the actuating lever $n^{90}$ for the market fractions-wheel $m^7$. A similar construction, comprising the pattern lever $t^7$, link $n^8$, arm $u^3$, loosely mounted on the shaft $n^6$ and having a hub $q^8$ provided with a stop shoulder 92, the arm $u^2$ loose on the shaft $n^6$ and having a coöperating stop shoulder and the controlling lever $s^9$ operates to actuate the maximum fractions-wheel from the market fractions-wheel whenever the market quotation equals or exceeds the previously registered maximum quotation.

Fast to the shaft $n^5$ is a collar $q^7$ having a stop shoulder 94 which coöperates with a corresponding stop shoulder on the hub of the arm $u^2$. This collar $q^7$ acts to hold the arm and its controlling lever in its inoperative position except at the times when the shaft $n^5$ is turned. The purpose of this construction is to prevent the minimum fractions-wheel from being disturbed except when both the tens-wheel and units-wheel of the market quotation are registering the same as the corresponding wheels of the minimum quotation. A similar collar $q^7$ is fast to the shaft $n^6$ so as to prevent the maximum fractions-wheel from operating except when both the market tens and units-wheels indicate the same figures that the maximum tens and units-wheels do, respectively.

*Indicator-operating mechanism.*—It will be remembered that there are as many indicating mechanisms, such as have been above described, as there are securities to be quoted. Each indicator mechanism has associated therewith an indicator-operating mechanism, and as all the indicator-operating mechanisms are alike, a description of one will suffice, and one only has been shown in the drawings.

Each indicator-operating mechanism comprises a pneumatic action for controlling the tens-wheel $m'$ of the market quotation set, another similar pneumatic action for controlling the units-wheel $m^4$ of said set, and a third pneumatic action for controlling the fractions-wheel $m^7$ of said set. These pneumatic actions are shown in Figs. IV and XV as being placed one above the other, and they embody the following construction.

Referring to Fig. IV a series of pneumatics $i^8$ are shown which are designated, respectively, 90, 80, 70, 60, 50, 40, 30, 20, 10, 00. These are the pneumatics for controlling tens-wheel. Each of these pneumatics comprises a chamber closed at one side by a diaphragm $h^4$, there being one such chamber for each of the numbers on the tens-wheel. Each diaphragm $h^4$ has projecting therefrom two studs $j$ which extend through hubs or bearings $j'$ depending from a board or support 18, one hub of each pair being longer than the other hub, as best seen in Fig. XVIII. Above the board or support 18 are two rock-shafts $j^3$ each having a plurality of arms $j^2$ projecting therefrom, the ends of said arms lying over and adapted to be acted on by the studs, as the diaphragm is raised. The right-hand end of the crank-shaft $j^3$ (Fig. IV), or the rear end in Fig. XV, has pivoted thereto links $j^6$ (see Figs. V and XV) which in turn are connected to other longitudinally-extending rock-shafts $j^7$ (see Fig. XV). Each rock-shaft $j^7$ has rigid therewith an arm 43 which is connected by a link $j^8$ with the controlling-levers $k'$, $k^2$, for operating the market tens-wheel $m'$. The hubs or stops $j'$ of the different pairs vary in length, the hub $j'$ nearest the observer for the 90 pneumatic (Fig. IV) having a maximum length and the opposite hub a minimum length, the succeeding hubs nearest the observer in said figure having a progressively decreasing length, and those further from the observer having a progressively increasing length. The hubs nearest the observer (Fig. IV) in the pneumatic 00 will have a minimum length, therefore, while the opposite hub has a maximum length. The result of this is that whenever the diaphragm $h^4$ is raised, the upward movements of the two studs connected thereto are limited by the length of the corresponding hubs. The stud nearest the observer, Fig. IV, in the 90-pneumatic will have a minimum upward movement, while the opposite stud will have a maximum movement, and therefore whenever the air is exhausted from the upper side of the 90-diaphragm and air pressure is admitted to the under side thereof, said diaphragm will be raised and the studs $j$ will act against the corresponding arms $j^2$, thereby turning the levers $j^3$. One lever obviously will be turned more than the other because one of the studs $j$ has a greater upward movement, and as a result the two controlling-levers $k'$ and $k^2$ will be moved differently, the movement being such as to turn the tens-wheel $m'$ so that "9" will be displayed through the opening $o'$. If, however, the air is exhausted from the top of the 40-diaphragm and air under pressure is admitted underneath thereof, the upward movement of the studs connected to said diaphragm will turn the two shafts $j^3$, but will give them a different relative movement, such different movement operating through the connections above described to turn the tens-wheel $m'$ into the proper position to indicate "4".

From the above description it will be seen that by operating any one of the diaphragms $h^4$ of the pneumatics the tens-wheel $m'$ can be turned into its proper position. The pneumatic action for operating the units-wheel $m^4$ is similar in every way, that is, it comprises a plurality of pneumatics having diaphragms $h^5$ (see Fig. IV), said pneumatics being numbered in said figure 0, 1, 2, 3, 4, 5, 6, 7, 8, 9. The diaphragm of each pneumatic has extending therefrom two plungers which pass through suitable hubs or bumpers $j'$, and said studs act against arms $j^2$ rigid with rock-shafts $j^4$, said rock-shafts being connected by suitable links $j^6$ with other rock-shafts $j^8$ parallel to $j^7$ but connected to the controlling-levers $n^9$, $k^5$ through suitable links $j^9$.

The pneumatic action for operating the fractions-wheel is similar in every way, that is, it comprises a plurality of pneumatics having diaphragms $h^6$ (see Fig. IV) each having the studs $j$ rising therefrom and extending through bumpers or hubs $j'$ of different length and adapted to act upon arms $j^2$ rigid with rock-shafts $j^5$. Said latter rock-shafts $j^5$ are connected to the controlling-levers $n^{90}$ by suitable links $j^9$. The pneumatics for operating the fractions-wheels are designated in Fig. IV: —, $\frac{1}{8}$, $\frac{1}{4}$, $\frac{3}{8}$, $\frac{1}{2}$, $\frac{5}{8}$, $\frac{3}{4}$, $\frac{7}{8}$, $\phi$.

From the above description, it will be seen how that by properly exhausting the space above any diaphragm and admitting air pressure beneath said diaphragm, the wheels of the market quotation set may be operated to indicate the quotation of any security.

It will be understood that between each indication the inflated diaphragms become deflated and the actuating levers $k^5$, $n^9$, $k^6$, $k^9$, etc., return to their normal positions so that for the making of any new indication said levers are always moved from their zero positions to that necessary to make the required indication.

The operation of the maximum and minimum quotation wheels has already been described, and it will be remembered, is effected from the operation of the market quotation wheels.

*Selecting mechanism.*—I will now proceed to describe the mechanism by which the indicator-operating mechanism for any desired security is selected. The spaces above the rows of diaphragms $h^4$, $h^5$ and $h^6$ for any security all have communication with each other by means of a space designated $i^2$, Fig. IV at the left hand end of said figure, which space leads to an exhaust chamber $d^8$ (see the upper left-hand corner Fig. IV) the communication between $d^8$ and the channel $i^2$ being normally closed by a valve $i'$. Since the space $i^2$ at the left of Fig. IV and the spaces above the rows of diaphragms all communicate with each other and are practically the same air space I have designated the spaces above the diaphragm by the reference numeral $i^2$, also. A single exhaust chamber $d^8$ may be used for a plurality of securities, in which case said common exhaust chamber has a port (normally closed by a valve $i'$) leading to the passage $i^2$ for each security. A separate exhaust chamber $d^8$ for each security may be used if desired, however. Whenever, therefore, the valve $i'$ for any security is raised, the spaces $i^2$ above all the diaphragms for said security will be exhausted, and any one of said diaphragms may then be operated by merely admitting air to the space beneath the proper diaphragm.

Before describing in detail the mechanism for selecting that valve $i'$ which is to be operated, and the mechanism for operating it, I will refer to the diagram in Fig. I, which shows the electrical connections from the printing telegraph. In said figure, 21 designates the shaft which bears the type-wheel of an ordinary printing telegraph receiver, and on the shaft is mounted an arm $a'$ carrying two contacts $a^2$ and $a^3$, said contacts being insulated from each other. The contact $a^2$ is adapted to wipe over a plurality of contacts $a^4$ which correspond to the letters of the alphabet of the type-wheel; and the contact $a^3$ is adapted to wipe over and contact with a similar series of contacts $a^5$ which correspond to figures, fractions, and other characters of the type-wheel. The circuit including the contact $a^2$ has therein a switch $a^6$, which is automatically operated by the printing telegraph instrument, and the circuit including the contact $a^3$ has therein a similar switch $a^7$ by means of which either of said circuits are closed.

I have not deemed it necessary to illustrate herein the printing telegraph itself, as such mechanism forms no part of my present invention. I would also state that while the diagram herein illustrated is one which corresponds with a printing telegraph using a single type-wheel, yet it will be obvious to one skilled in the art what changes would be necessary in the circuit maker to adapt it to a printing telegraph having a pair of type-wheels. Moreover I would state that in the use of my invention I do not wish to limit myself to a printing telegraph receiver as the controlling agent, but that any device may be used for closing the electric circuits herein described whether automatically or manually operated.

Each contact $a^4$ is connected by a suitable wire 22 with a swinging contact terminal $b'$ of an automatic switch, the details of which are best shown in Fig. X. This switch comprises a swinging member $b$, which is shown in end view Fig. X, and which extends the full length of the line of switches and which carries a plurality of independent swinging contact terminals $b'$, one of which is shown in Fig. X. There are as many of these swinging contacts $b'$ as there are contacts $a^4$, and as the switch $b$ is turned the contacts $b'$, carried thereby, are connected with the corresponding terminals $b^2$ and $b^3$ alternately. Each terminal $b^3$ is connected to a circuit 23 having therein a magnet $c$, and said circuits 23 are all connected to a common wire 230, which includes the coils of a magnet $c^2$, there being only one such magnet $c^2$ for the whole stock-board. A magnet $c$, however, is provided for each letter of the alphabet.

The switch $b$ is so constructed that immediately upon the cessation of the impulse which energizes the magnet $c^2$, the swinging terminals $b'$ are caused to shift in unison from the contact terminals $b^3$ to the contact terminals $b^2$. Each contact terminal $b^2$ is in a circuit 24 which includes a magnet $c'$, there being as many such magnets $c'$ and circuits 24 as there are letters of the alphabet or as there are contacts $a^4$.

From the above description it will be seen that whenever the contact $a^2$ engages any contact $a^4$, and the corresponding circuit is automatically closed by the switch $a^6$ an impulse will be sent through the corresponding magnet $c$, since the swinging terminals $b'$ of the switch $b$ are all in engagement with the corresponding terminals $b^3$. The same impulse will be sent through the magnet $c^2$. The energizing of the latter magnet shifts the switch $b$ to throw the terminals $b'$ into contact with their respective terminals $b^2$, but this does not occur until the cessation of the first impulse. When, therefore, a second impulse is sent through the circuits, one of the magnets $c'$ will be energized depending upon the position of the contact $a^2$. If, therefore, the contact $a^2$ is in engagement with the contact $a^4$, corresponding to the letter "A," the closing of the switch $a^6$ will in the first place energize the A-magnet $c$ and also the magnet $c^2$, thereby shifting the switch $b$, and if before a second impulse is sent the contact $a^2$ is shifted to engage the contact $a^4$ corresponding to letter "S" the second impulse will be sent through the S-magnet $c'$. Referring now back to Fig. IV, wherein is shown one of the magnets $c$ and the mechanism it operates, it will be seen that the valve $d^2$, which may be the armature of the magnet, if desired, controls communication of a duct $d^3$ with the atmosphere, said duct terminating in a chamber $d^5$ having a diaphragm $d^4$ therein, which diaphragm is adapted to act on the stem $f^2$ of a pneumatic valve $f, f'$. The valve $f'$ controls communication between an exhaust-chamber $d^6$ and a chamber $d^9$, and the valve $f$ controls communication between said chamber $d^9$ and a chamber $d^7$ which communicates with the atmosphere. There is one chamber $d^9$, a valve $f$, $f'$, controlling the same, and a magnet $c$ for each letter of the alphabet.

Within the exhaust-chamber $d^8$ are a plurality of pairs of pneumatics $f^6$, $f^7$, (one for each security), the pneumatics of each pair being connected to a rocker-arm $h^2$, which is adapted to act on the stem $i$ of the valve $i'$ and thereby control the latter. In order to make it perfectly clear, I will repeat that there is a chamber $d^9$ for each letter of the alphabet, and a pair of bellows $f^6$, $f^7$, for each security.

The chamber $d^9$ corresponding to any letter of the alphabet is connected by suitable conduits $f^5$ to the pneumatics $f^6$ of all the securities whose abbreviations commence with said letter. For instance, if the chamber $d^9$ in Fig. IV corresponds to letter A, then the conduits $f^5$ leading from said chamber are connected with the pneumatics $f^6$ corresponding to all those securities whose abbreviations begin with A. The energization of any magnet $c$ opens the corresponding valve $d^2$ and admits air to the passage $d^3$. As soon as air is admitted to this passage $d^3$ there is a preponderance of pressure on the underside of the diaphragm $d^4$, it being understood that there is suction on the upper side thereof, and, therefore, the valve-stem $f^2$ is raised, closing the valve $f'$ and opening the valve $f$.

In order to maintain the valve-stem $f^2$ in its raised position after the deënergization of the magnet $c$ and until restored by means hereinafter described, the chamber $d^5$ and its diaphragm $d^4$ are arranged as follows:—The diaphragm $d^4$ is provided with a bleed hole near its periphery, said bleed hole 41 (Fig. XIX) tending to equalize the pneumatic pressures in the chamber $d^6$ and the duct $d^3$ until the valve $d^2$ is opened. When, however, the diaphragm $d^4$ is lifted by air pressure on the underside, the bleed hole 41 is pressed against the roof of the chamber $d^6$ and is closed thereby with the result that the air pressure in the duct $d^3$ is maintained even after the valve $d^2$ is closed and consequently the valve-stem $f^2$ is held in its raised position, as desired. When the valve $f$ is opened air is admitted to the chamber $d^9$ and to the pneumatics $f^6$ of all the securities having an abbreviation commencing with the letter corresponding to that of the magnet $c$.

Referring now to Fig. VI, one magnet $c'$ and its connected parts is shown. This magnet controls a valve $d^2$, which may, if desired, be the armature of the magnet, and which opens or closes a duct $d^3$ which terminates in a compartment $d^5$ having a diaphragm $d^4$ therein. The diaphragm is adapted to act against a valve-stem $f^2$ carrying two valves $f^9$ and $f^8$. The valve $f^9$ controls communication between an exhaust-chamber $d^6$ and a chamber $h$; and the valve $f^8$ controls communication between a chamber $d^7$ communicating with the atmosphere and said chamber $h$.

There is one magnet $c'$ for each letter of the alphabet, as has been before stated, and consequently one chamber $h$ for each letter of the alphabet. Each chamber $h$ is connected by conduits $h'$ with the pneumatics $f^7$ of all the securities whose abbreviations end in the letter to which the chamber $h$ corresponds. For instance, if, in Fig. VI, the chamber $h$ corresponds to the letter C, then the conduits $h'$ will connect said chamber with all the pneumatics $f^7$ of those securities, the second letter of the abbreviation of which is C. Whenever a magnet $c'$ is energized, its valve $d^2$ is raised and air is admitted to the underside of the diaphragm $d^4$. The valves $f^8$ and $f^9$ are thereby elevated, thus closing the chamber $h$ to the atmosphere and opening it to the exhaust chamber $d^6$, with the result that all of the pneumatics $f^7$ connected to said chamber $h$ are exhausted. The valves $f^8$ and $f^9$ when displaced by the magnet $c'$ are maintained in such displacement after the deënergization of said magnet by the same arrangement of the bleed hole in the diaphragm $d^4$ already described.

Referring now to Fig. XIII, the operation of this part of the selecting mechanism will be made more clear. Suppose, for instance, the abbreviation of the security it was desired to quote was B. T. In this event, the contact $a^2$ would be brought into engagement with the B-contact $a^4$, and the B-magnet $c$ would be energized. The energizing of this magnet admits air to the pneumatics $f^6$ for three securities, as shown in the illustrated example in Fig. XIII, and, therefore, said three pneumatics $f^6$ are open to the atmosphere. This opening of these pneumatics $f^6$ to the atmosphere, however, does not change the position of them, because the rocker arm $h^2$ pivoted at $h^3$ (Fig. IV) requires the pneumatics $f^7$ to be closed when pneumatics $f^6$ are inflated and vice-versa. But when pneumatics $f^7$ are inwardly exposed to the atmosphere and outwardly surrounded by the exhaust chamber $d^8$, the communication of pneumatic $f^6$ with the atmosphere only balances the upward pressure on both sides of fulcrum $h^3$ (so far as these pneumatics are concerned) and cannot overcome the atmospheric pressure on the top side of valve $i'$, in consequence of which the latter remains closed until the air is withdrawn from pneumatic $f^7$. The energization of the magnet $c^2$ shifts the swinging contacts $b'$ of the switch $b$ into contact with the terminals $b^2$, and when the arm $a'$ is moved so as to bring the contact $a^2$ into engagement with the contact $a^4$ corresponding to the letter "T", this being the second letter of the abbreviation, the T-magnet $c'$ will then be energized. The energization of this particular magnet $c'$ will result in exhausting the pneumatics $f^7$ for all the securities having T for the second letter of the abbreviation. The exhausting of these bellows $f^7$, however, does not effect their position so long as the corresponding bellows $f^6$ are exhausted. The particular pair of pneumatics, however, corresponding to the security B T will, by this operation, have the the pneumatic $f^7$ exhausted and $f^6$ connected with the atmosphere, and the result will be a turning of the rocker-arm $h^2$ to open the valve $i'$ and thus connect the passages $i^2$ of the indicator-operating mechanism for this particular security B T with the exhaust chamber $d^8$.

The mechanism operated by the magnet $c^2$ and which operates the switch $b$ will now be described. Referring to Fig. X, it will be seen that the magnet $c^2$ controls a valve $d^2$ leading to a duct $d^3$ which is separated from an exhaust-chamber $d^6$ by a diaphragm $i^5$. A double valve 25 normally closes communication between the exhaust-chamber $d^6$ and a pneumatic $y$. When, however, the magnet $c^2$ is energized, and air is admitted to the duct $d^3$, the diaphragm $i^5$ raises the valve 25 and closes communication between said pneumatic and the atmospheric chamber $d^7$, and connects said pneumatic to the exhaust-chamber $d^6$, thereby exhausting said pneumatic. Pivoted to the pneumatic is a latch-arm $y^2$ which is adapted to operate the switch $b$, said switch being that illustrated diagrammatically in Fig. I. This switch $b$ is a pivoted member having a stud $p$ on which the latch-arm $y^2$ rests and carrying a swinging switch-blade $b'$ which is the terminal $b'$ shown in Fig. I. This switch-blade $b'$ is adapted to engage either of two contacts $b^2$, $b^3$, corresponding to the terminals $b^2$, $b^3$, in Fig. I. The terminal $b^3$, in Fig. X, is electrically connected with the corresponding magnet $c$; and the terminal $b^2$ is connected with the corresponding magnet $c'$.

With the parts arranged as they are in Fig. X, the switch $b$ is arranged so that the terminals $b'$ and $b^3$ are connected, and hence when an impulse is sent through the circuit, the magnet $c$ will be energized with the results above described. The magnet $c^2$ will be simultaneously energized, and the pneumatic $y$ collapsed. This collapsing of the pneumatic moves the latch $y^2$ to the right (Fig. X) so that the shoulder therein will drop down to engage the stud $p$. The energization of the magnet $c^2$ is momentary only, and a bleed hole $i^6$ permits the duct $d^3$ to be exhausted immediately upon the closing of the valve $d^2$, thereby allowing the valve 25 to drop back into its normal position depressing the diaphragm $i^5$, and opening the air chamber $d^7$ to the pneumatic $y$. The latter is immediately expanded by the spring $y'$. As the pneumatic thus resumes its expanded position by the action of the spring $y'$, the latch-arm $y^2$ by its engagement with the pin $p$ shifts the switch $b$ to bring the swinging contacts $b'$ into engagement with the contacts $b^2$, so that when the next impulse is sent through the circuit the magnet $c'$ will be energized, thereby completing the selection of the security to be indicated.

It will be understood that in Fig. X only one set of contacts $b'$, $b^2$, $b^3$, has been shown, but there are as many such sets of contacts as there are letters of the alphabet, and that all these contacts $b'$ are operated by the pneumatic $y$, above described. In order to restore the switch $b$ to contact with the terminals $b^3$ after the indicating mechanism for any security has been operated, the magnet $c^3$ is provided as shown in Figs X and I. This magnet is in a suitable circuit shown clearly in Fig. I, and is arranged so that it will be energized after the indicating mechanism for any security has been operated, and when energized it serves to operate a pneumatic $y^3$ in the same manner as the pneumatic $y$ is operated by the magnet $c^2$. Attached to the pneumatic $y^3$ is a releasing projection $y^4$ which is adapted to engage the nose of the latch-arm $y^2$ when the pneumatic $y^3$ is collapsed, thereby releasing said arm from the stud $p$ and allowing the switch $b$ to be restored to its initial position by means of the spring $r$.

Having described above the mechanism for selecting the indicator-operating mechanism of any desired security, I will now proceed to describe how the indicator-operating mechanism of the selected security is operated from the printing telegraph. Referring now to Fig. I, the terminals $a^5$ shown in a line are assumed to be the same as the contacts $a^5$ arranged in a circle. These contact $a^5$ correspond to the numerals and fractions, and those which correspond to the numbers 0 to 9 are each electrically connected with the terminals of a switch $e$ which is similar in construction to the switch $b$. That is, it comprises a swinging member $e$ (see Fig. XIV) similar to $b$ having a plurality of swinging contacts $e'$ adapted to engage either of the corresponding terminals $e^2$ or $e^3$. The terminals $e^3$ are in circuits including the magnets $c^4$; while the terminals $e^2$ are in circuits including the magnets $c^5$. The return wire of the circuits including the magnets $c^4$ includes the magnet $c^7$, so that whenever anyone of the magnets $c^4$ is energized, the magnet $c^7$ is also energized. The magnet $c^7$ controls the multiple switch $e$, in the same way as described in connection with the switch $b$ and hence the sending of an impulse through one of the magnets $c^4$ will energize the magnet $c^7$, and the energization of said magnet $c^7$ will throw the switch $e$ to connect the swinging contacts $e'$ with the corresponding magnets $c^5$. The magnets $c^4$ and $c^5$ control the pneumatics for operating the tens and units-wheels of the indicating mechanism. The other terminals $a^5$ corresponding to the fractions and other characters are connected to corresponding magnets $c^6$, and the latter magnets $c^6$ control the pneumatics for operating the fractions-wheels.

Briefly stated, the operation of setting the indicators when the proper indicator-operating mechanism has been selected, is to swing the arm $a'$ to bring the contact $a^3$ into engagement with the contact $a^5$ corresponding to the tens-digit of the number to be indicated, and send an impulse through the circuit by the automatic closing of the switch $a^7$, thus energizing the corresponding magnet $c^4$ and causing the tens-wheel to be operated, and at the same time shifting the switch $e$ so as to bring the magnets for the units-wheels in the circuit. The arm $a'$ is then moved so that the finger $a^3$ will engage the contact $a^5$ corresponding to the units-digit of the number to be indicated and an impulse sent through the circuit by the closing of the switch $a^7$, thus energizing the corresponding magnet $c^5$ and operating the units-wheel. The arm $a'$ is then turned so that the contact $a^3$ engages the contact $a^5$ corresponding to the fraction to be designated and another impulse sent through the circuit by the closing of the switch $a^7$, thereby energizing the corresponding magnet $c^6$ and operating the fractions-wheel.

The operative connections between the magnets $c^4$, $c^5$ and $c^6$, respectively, and their respective pneumatics, are the same, and a description of one will suffice for all. In Fig. XI I have illustrated the manner in which these magnets control their corresponding pneumatics, and this illustration might apply to the connection between any magnet $c^4$, $c^5$ or $c^6$ and its corresponding pneumatics, and therefore the magnet shown in Fig. XI is designated $c^4$, $c^5$, $c^6$. Each of these magnets controls a valve $d^2$ of a duct $d^3$ which leads to a chamber closed by a diaphragm $i^5$. Above this chamber is a suction-chamber $i^3$, and this suction-chamber communicates with a plurality of conduits or other chambers $i^7$ which extend to the various pneumatic chambers $i^8$, as shown in Fig. IX. The chambers $i^8$ extend the length of the stock-board beneath the pneumatics $h^4$, $h^5$, $h^6$ of the various indicator-operating mechanisms. Each chamber $i^7$ therefore connects with the same chamber $i^8$ of all the operating mechanisms, that is, one chamber $i^7$ communicates, for instance, with the 90-chamber $i^8$ of all the indicator-operating mechanisms, and another chamber $i^7$ communicates with the 80-chamber $i^8$, of all the indicator-operating mechanisms, etc. Communication between each chamber $i^7$ and the common exhaust-chamber $i^3$ is controlled by a valve $f'$, which in turn is operated by the diaphragm $i^5$, and communication between each chamber $i^7$ and a common wind or atmospheric chamber $i^4$ is controlled by a valve $f$ which is attached to the same valve-stem $f^2$ that the valve $f'$ is. With this construction, it will be seen that whenever the magnet $c^4$ corresponding to the Fig. IX is energized, said magnet will open the corresponding valve $d^2$ and admit air beneath the corresponding diaphragm $i^5$, thus inflating said diaphragm, closing the corresponding valve $f'$, and opening the corresponding valve $f$. When the valves have thus been shifted, the chamber $i^7$ leading to the 90-chamber $i^8$ beneath the 90-pneumatics $h^4$ for each of the indicator-operating mechanisms, is connected through the valve $f$ with the pressure-chamber $i^4$, and if the air has been previously exhausted from the passage $i^2$ above one of said pneumatics $h^4$ belonging to a particular security mechanism, the pneumatic will be lifted and the market tens-wheel of said security mechanism will be operated to indicate 9. The same operation is repeated for each of the magnets $c^5$, $c^6$.

From the above description it will be seen that the selecting mechanism involves different groups of selector units which are herein shown as pneumatics there being one group of such selector units for each letter of the alphabet, that is, all the pneumatics or selector units corresponding to the letter A constitute one group, all those corresponding to the letter B constitute another group, etc. It will also be seen that in making an indication, one operation is to actuate that group of selector units corresponding to the first letter of the abbreviation of the commodity whose price is to be indicated. The next step is to actuate another group of selector units corresponding to the second letter of the abbreviation, and as a result the particular selector unit which is in both groups will be rendered operative to cause a proper indication of the price of the commodity represented by said selector unit to be actuated. It will thus be seen that the selective mechanism I employ is a progressively selective mechanism, that is, it acts progressively to finally select the proper indicator for indicating the price of the desired commodity.

In order to better describe the operation of my device, we will suppose, for instance, that the following is printed on the tape of a ticker and the quotations thus printed are to be indicated automatically by the mechanism above described.

```
LN        AC    .SP  .AC   .MP           .LN   .SP
 1         1     1    7     1         3   1     7
40 2.    300   81 4.  67 8.  80 8.    09 2 S500S 8. 40 4.  66 8.

.MP        AC         MP
 5                         3 7              7
09 8      200     81 -.    300    0: 4.8.10-. S400S0 9 8
```

It will be noticed in passing that the question of whether a stock is sold at $40\frac{1}{2}$ or $140\frac{1}{2}$ is left for the observer to answer through his intimacy with the market, since the use of numbers of three digits would unduly complicate the mechanism. As the shaft 21 of the printing telegraph turns to print L the contact $a^2$ is simultaneously brought into engagement with the L-contact $a^4$, and the L-magnet $c$ is energized. The mechanical movement in the ticker which is used to make the imprint of the letter L upon the tape is connected in my controlling device with the switch $a^6$ so that electrical impulses will be sent through the contacts $a^4$ only in accordance with the corresponding letters as they are printed upon the tape. The energization of the magnet $c$ opens to the atmosphere all of the pneumatics $f^6$ which belongs to securities whose abbreviations begin with L, as has been fully described above. Simultaneously with the energization of magnet $c$, the magnet $c^2$ is energized, and the switch $b$ is thereby turned to bring the swinging contacts $b'$ into contact with the corresponding terminals $b^2$. The said switch $b$ having thus been shifted, immediately upon the cessation of the impulse which printed L on the tape, and which opened the L-pneumatics $f^6$ to the atmosphere, the following impulse printing N will direct a circuit through the N-magnet $c'$, said magnet operating through the pneumatics controlled by it (see Fig. VI) to exhaust the air from all the N-pneumatics $f^7$. The single pair of pneumatics $f^6$ and $f^7$ which combines connections with the L-chamber $d^9$ and the N-chamber $h$ will then be operative in opening its valve $i'$ and exhausting the chambers $i^2$ belonging to the LN indicator-operating mechanism. Let us assume for illustration that this LN quotation is the first of the day's transactions, and that the maximum and minimum wheels have been previously set to register 00 and 99¢, respectively. When the printing telegraph prints 4, the contact $a^3$ will be in engagement with the 4-contact $a^5$ and an impulse will be sent through the 4-magnet $c^4$, by reason of the fact that the mechanical movement in the ticker which is used to make the imprint of the figures and fractions on the tape is connected with the circuit maker $a^7$. When the 4-magnet $c^4$ is energized, it will operate to lift its valves $f$, $f'$ to shut off the exhaust chamber $i^3$ and open the wind chamber $i^4$ to the channel $i^7$ leading to the 40-compartment $i^8$ (see Fig. IV) beneath the 40-pneumatics $h^4$ of all the indicator-operating mechanisms. The particular pneumatic $h^4$ which has wind pressure on its underside and vacuum on its upper side is lifted, thereby turning, through the mechanism above described, the market quotation tens-wheel to register 4, said mechanism operating to turn the minimum and maximum tens-wheels to register 4. When 0 is printed, the contact $a^3$ engages the 0-contact $a^5$, and since the switch $e$ has been thrown by the simultaneous energization of the magnet $c^7$ with the 4-magnet $c^4$, the next impulse energizes the 0-magnet $c^5$, and said 0-magnet operates as above described to set the three units-wheels to 0. When the $\frac{1}{2}$ is printed on the tape, the contact $a^3$ engages with the $\frac{1}{2}$ contact $a^5$, thus energizing the $\frac{1}{2}$ magnet $c^6$, thereby causing the fractions-wheels to register $\frac{1}{2}$. The printing of the two dots following is coincident with energizing the magnets $c^3$ and $c^8$, respectively, said magnets operating to restore the switches $b$ and $e$ to their original positions.

The mechanism controlled by the magnet $c^8$ is almost identical in construction with that controlled by the magnet $c^3$, as will be seen by reference to Figs. XIV and X respectively, and the function of said magnet $c^8$ is to operate the pneumatic 103 which in turn operates to restore the switch $e$ to its initial position.

It will be understood that the switch $e$ is moved into engagement with the contact $e^2$ by the operation of a pneumatic which is controlled by the magnet $c^7$, and which has connected thereto the pawl 104, so that whenever said pneumatic is actuated, the pawl 104 will engage the pin 85 projecting from an arm connected with the switch and will swing said switch into engagement with the contact $e^2$. The pawl is released to permit the switch to resume its initial position by the collapsing of the pneumatic 103, as above described.

When the magnet $c^8$ is energized by the engagement of the contact $a^3$ with the proper contact $a^5$, the valve $d^2$ is raised, thereby admitting air beneath the diaphragm 105, and raising the valve 106 to close communication between the pneumatic 103 and the wind chamber 107 and opening it between said pneumatic and the exhaust chamber 108 whereby the pneumatic is exhausted and the tail 109 thereon lifts the pawl 104 from engagement with the pin 85 and allows the spring 86 to return the switch $e$ to its initial position.

The magnet $c^8$ operates merely to restore the switch $e$ to its original position, but the magnet $c^3$ performs the added function of restoring all the valves controlled by the magnets $c$ and $c'$. This is accomplished by mechanism shown in Fig. X wherein it will be seen that the pneumatic $y^3$ has a link $n$ connected thereto to which is connected a rod $y^5$ that extends through an aperture in the casing and is pivotally connected to a valve restorer $f^3$ that is arranged to act on the valves controlled by the magnets $c$ and $c'$. Upon referring to Fig. IX wherein the front of the indicator is shown broken away, the magnets $c^9$, $c^2$ and $c'$ are illustrated in a horizontal row, it being understood that the remainder of the magnets $c$, $c'$ are placed in the same row together with the magnet $c^3$. This longitudinal arrangement of the magnets and the pneumatic valve systems operated thereby enables me to use a valve restorer $f^3$ in the form of a long horizontal strip, an end view of which is seen in Fig. X, and which strip extends over all the valve stems belonging to magnets $c$ and $c'$. The connection between this valve restorer and the pneumatic $y^3$, which is readily seen from Fig. X, is such that the collapsing of the pneumatic will permit the valve restorer to drop onto the valve stems with which it coöperates while the inflation of said pneumatic lifts the valve restorer off from the stems.

$y^6$ is a weight which is attached to the pneumatic, said weight slightly overbalancing the weight of the valve-restorer $f^3$.

Exhaustion of the pneumatic $y^3$ lowers the restoring device $f^3$ and pushes the L- and N-valve-stems $f^2$ downward and opens the bleed hole in the flexible diaphragms $d^4$, so that the ducts $d^3$ are again exhausted to retain said diaphragms in their depressed positions, while at the same time the L-chamber $d^9$ and the N-chamber $h$ are restored to their normal communications with the exhaust chamber $d^6$ and wind chamber $d^7$ respectively, thereby returning the LN pneumatics $f^6$, $f^7$ to their normal positions, and closing the valve $i'$. The leakage of air between the plungers $j$ and their studs $j'$ will restore the chambers $i^2$ to their normal condition of atmospheric pressure immediately upon the closing of the valve $i'$.

The valves 106 controlled by the magnets $c^3$ and $c^8$ respectively are restored to their initial position, as shown in Figs. X and XIV, by a bleed hole $i^6$ which establishes communication between the exhaust chamber $d^6$ and the ducts $d^3$. As soon as either of these two magnets are deënergized and valve $d^2$ controlled thereby dropped to close the duct $d^3$, the air pressure on each side of the diaphragm will be immediately equalized because of the bleed hole, and when this occurs, the valves are dropped to their initial position.

The printing of 300 on the tape will be accompanied by the momentary shifting of the 3-valve and the 0-valve without effecting any of the pneumatics $h^4$, $h^5$ or $h^6$. This is simply to indicate to observers of the tape that 300 shares of the following security were sold. When no number precedes the abbreviation, 100 shares is understood. The printing of the abbreviation AC operates as above described to select the particular pair of pneumatics $f^6$, $f^7$ corresponding to this security, and the printing of 81¼ operates as above described to set the AC indicators at 81¼. The indicating of the quotation of SP 67⅛ is accomplished by the same steps above outlined.

The next quotation of AC at 80⅞ requires that the minimum quotation wheels should be set with the market wheels, this being accomplished as described more at length above.

The next quotation indicates two sales of the MP security, one at 109½ and the other 109¾. The first sale is for 100 shares and the second for 500 shares. The letter S as here used corresponds with that particular contact $a^5$ which connects with the magnet $c^9$ of the switch $d'$. The same pneumatic action is employed in connection with the magnet $c^9$ as with the magnets $c^2$ and $c^3$, such action being shown in Fig. XII. The energization of $c^9$ operates to collapse the pneumatic $z$. Said pneumatic has a connection $z'$ extending therefrom adapted to engage the switch $d'$ which switch normally closes against the contact $a^8$ and thus completes the return circuit from all the magnets except the magnet $c^9$. When the pneumatic $z$ is exhausted, the projection $q^3$ in the connection $z'$ is forced into the notch $z^2$ of the switch $d'$, and the latter is thus disconnected from the contact $a^8$. The result of this is the breaking of the entire circuit containing all the magnets except the magnet $c^9$ and thus disconnecting the whole stock-board from the printing telegraph. After the printing telegraph has recorded the 500, S is again printed, and $c^9$ again energized, and the pneumatic $z$ again exhausted. This second exhaustion of the pneumatic $z$ operates to return the switch $d'$ to its initial position by reason of the engagement of the lug $q^3$ with the notch $z^3$, as seen in Fig. XII. The closing of the switch $d'$ again closes the circuit of the magnets and puts the stock-board into operation.

The manner in which the other quotations above indicated will be designated by the stock-board will be evident in view of the foregoing description.

A suction pump of any suitable type may be used to operate the pneumatic action; or, by reversing the arrangement of the valves throughout the stock-board, a blower of any of the types used in organs may be provided. In Fig. IX a windway $i^9$ is shown leading from the chambers $d^6$, $d^8$ and $i^3$ to a pressure equalizer $v$ and a pair of exhaust bellows $w$. The latter are suitably provided with valves for expelling the air into the open, and are connected by means of the driving rods $w^1$ with a wheel $w^2$ geared to the armature-shaft $w^3$ of an electric motor $m$. The equalizer $v$ is provided with a weight $v^1$ to offset a certain amount of external atmospheric pressure thereon and maintain a constant degree of exhaustion within. To the weight box $v^2$ of the equalizer $v$ is attached a chord $x$ connected at its other end with a weight $x^1$ (or spring) to hold it taut. This chord operates a rheostat $x^2$ or other governor for the motor $m$. When the operation of the board introduces air into the windway $i^9$ faster than it is pumped out, the weight $v^1$ will pull the equalizer down sufficiently to shift the rheostat $x^2$ and make the motor $m$ and exhaust bellows $w$ work more rapidly. If the pump exhausts air more rapidly than it is introduced into the windway $i^9$ the equalizer $v$ will again lift the weight $v^1$ and shift the rheostat $x^2$ the other way allowing the motor to work more slowly.

I propose to use any suitable automatically-operative means, such for instance as the springs 116 to restore the indicating wheels to their initial position, when the pawls are disengaged from the actuating means.

I have shown the magnet $c^3$ in an independent circuit, but it will be understood that it might be placed in series with the magnet $c^6$ or $c^5$ without departing from my invention, as shown in the modification illustrated in Fig. XVII.

The particular embodiment of the invention herein illustrated is one adapted for use where each security is denoted by an abbreviation of two letters, but I wish to state that the invention is not limited to this particular embodiment, nor in any way except as specified in the appended claims.

In Fig. I certain of the contacts $a^5$ are connected in parallel by rivets $a$. This construction may be employed where the series of contacts $a^5$ contain two contacts for the same number.

In Fig. IX I have shown an arrangement of the board $o^4$ wherein spaces are provided for posting manually the opening, high, low, and closing quotations of the previous day. Where my improved automatic indicating mechanism is employed in connection with a board having these spaces for thus exhibiting the opening high, low and closing quotations of the previous day, said latter quotations as well as the quotations for any given day may be simultaneously displayed.

It will be seen from the above that each indicating wheel is set to indicate the desired number by a single electrical impulse, and in this respect my invention differs from those devices in which the indicating wheels are moved forward with a step-by-step movement to show the indications thereon successively.

It will be understood of course that the above description refers to the embodiment of my invention herein illustrated, but I would state that my invention is not limited to the exact construction shown. I prefer to use indicating wheels for the indicating members, but the wheel construction of the indicating member is not essential. Similarly while the particular form of pneumatic action employed is that which I prefer, yet the invention is not limited thereto. Various changes, therefore, in the construction of the parts may be made without departing from the invention as expressed in the claims, certain of which are very broad.

By the term "intelligence-transmitting instrumentality" as used above and in the claims I mean any instrument, such as a printing telegraph, which is capable of transmitting intelligence from one point to another.

Having described my invention what I claim as new and desire to secure by Letters Patent is:—

1. In a device of the class described, a plurality of quotation indicators, one for each of several stocks or commodities, selective mechanism having means for adjusting said quotation indicators at will in accordance with any desired sequence of quotations of the several stocks or commodities and in accordance with any desired sequence of values for the quotations of any individual stock or commodity, and an intelligence-transmitting instrumentality operatively connected by said selective mechanism with said quotation indicators.

2. In a device of the class described, a set of quotation indicators for each of several stocks or commodities, each set comprising a market, maximum and a minimum quotation indicator, selective mechanism provided with means for selecting at will the set of quotation indicators for any stock or commodity and selectively operating the market quotation indicators of the selected set to display any desired sequence of quotations of a stock or commodity, means for actuating the maximum and minimum indicators only when the market quotations exceed previous limitations of quotation, and an intelligence-transmitting instrumentality operatively connectible by said selective mechanism with said quotation indicators.

3. In a stock market indicator, a plurality of price indicators, one for each of several stocks or commodities, a plurality of initial selector units each adapted to select a group of said price indicators, a plurality of complementary selector units each adapted to select a single one out of said group of price indicators, and means to operate said selected indicator to display any desired quotation.

4. In a device of the class described, a plurality of market quotation indicators selectably operative to display quotations in accordance with any desired succession of said quotations, and means common to all the indicators to communicate said quotations thereto from a central station.

5. In a device of the class described, market-quotation indicators selectable at will, minimum-quotation indicators, and maximum-quotation indicators, both operated from the market-quotation indicators and electro-responsive indicator-actuating mechanism capable of setting said indicators to display in classified form a succession of quotations transmitted from a common source for any desired sequence of stocks or commodities.

6. In a device of the class described, a printing telegraph, a market-quotation indicator, and pneumatic means rendered operative by said printing telegraph to actuate said indicator to indicate a quotation.

7. In a device of the class described, a plurality of indicating members to indicate separately the digits and fractions of market quotations, said indicating members being arranged in groups, each group comprising the indicating members for a single stock or commodity, a group of setting devices associated with each group of indicating members, selective means to render controllable any one of said groups of setting devices, and an actuating mechanism common to all the setting devices and rendered operative by a single electrical impulse to actuate the selected setting devices.

8. In a device of the class described, a printing telegraph instrument, a plurality of indicating members to indicate a stock-market quotation, and pneumatic operating means therefor electrically controlled by said printing telegraph instrument.

9. In a device of the class described, a plurality of indicating members to indicate the market quotations of securities or commodities in tabulated form, separate setting devices for the respective indicating members of each security or commodity, a group of selector units each adapted to partially select the setting devices for actuation, a plurality of complementary selector units each adapted to complete the selection of said setting devices, and a mechanism adapted to control the action of the selected setting devices causing the latter to set their indicating members to display any desired quotation.

10. In a device of the class described, a set of indicating members for indicating a market quotation, means for operating each member of the set, a plurality of minimum-quotation members, and means to operate the latter members from the operating means for the market-quotation members.

11. In a device of the class described, a set of indicating members for indicating a market quotation, means for operating each member of the set, a plurality of maximum-quotation members, and means to operate the latter members from the operating means for the market-quotation members.

12. In a device of the class described, a plurality of indicator units each adapted to make several indications, a plurality of coöperating selector units operative in various combinations whereby each combination selects a different indicator unit, an indicator-setting device to cause the indicator units to display different quotations, and means to operatively connect said setting device with any indicator unit selected by the coöperation of said selector units.

13. In a device of the class described, an indicator comprising a plurality of indicating members, one for indicating the tens digit of a number, one for indicating the unit digit, and one for indicating fractions, pneumatic means to operate said members separately, a printing telegraph instrument, and electrical connections between said instrument and the pneumatic means whereby the latter are operated from the former.

14. In a device of the class described, a set of market-quotation indicating members, means to operate each of said members, a corresponding number of minimum-quotation members, operative connections between each minimum-quotation member and the operating means for the corresponding market-quotation member, and means to render each of said connections inoperative when the corresponding market-quotation member is indicating a number greater than the corresponding minimum-quotation member.

15. In a device of the class described, a set of market-quotation indicating members, means to operate each of said members, a corresponding number of minimum-quotation members, operative connections between each minimum-quotation member and the operating means for the corresponding market-quotation member, and mechanism to render the units and fractions minimum members inoperative when the minimum and market-tens members differ in registration.

16. In a device of the class described, a set of market-quotation indicating members, means to operate each of said members, a corresponding number of minimum-quotation members, operative connections between each minimum-quotation member and the operating means for the corresponding market-quotation member, and mechanism to render the minimum-fractions member inoperative when either the tens or the units members of the minimum set differ in registration from their corresponding members of the market set.

17. In a device of the class described, a set of market-quotation indicating members, means to operate each of said members, a corresponding number of maximum-quotation members, operative connections between each maximum quotation member and the operating means for the corresponding market-quotation member, and mechanism to render the units and fractions maximum-members inoperative when the maximum and market tens members differ in registration.

18. In a device of the class described, a set of market-quotation indicating members, means to operate each of said members, a corresponding number of maximum-quotation members, operative connections between each maximum-quotation member and the operating means for the corresponding market-quotation member, and mechanism to render the maximum fractions member inoperative when either the tens or the units members of the maximum set differ in registration from their corresponding members of the market set.

19. In a device of the class described, a set of market quotation indicating members, means to operate each of said members, a corresponding number of minimum quotation members, operative connections between each minimum-quotation member and the operating means for the corresponding market quotation member, and means to render said connections inoperative when the market quotation members are indicating a number greater than that indicated by the minimum quotation members.

20. In a device of the class described, a set of market-quotation indicating members, means to operate each of said members, a corresponding number of maximum quotation members, operative connections between each maximum quotation member and the operating means for the corresponding market-quotation member, and means to render said connections inoperative when the market-quotation members are indicating a number less than that indicated by the maximum-quotation members.

21. In a device of the class described, a set of market-quotation indicating members, means to operate each of said members, a corresponding number of maximum-quotation members operative connections between each maximum-quotation member and the operating means for the corresponding market-quotation member, and means to render each of said connections inoperative when the corresponding market-quotation member is indicating a number less than the corresponding maximum-quotation member.

22. In a device of the class described, a market-indicating member, operating means therefor, a minimum-indicating member, operative connections between the latter member and the operating means for the former member, and means to render said connections inoperative when the market-indicator member registers greater than the minimum-indicator member, and to render said connections operative when the two members register alike.

23. In a device of the class described, a market-indicating member, operating means therefor, a maximum-indicating member, operative connections between the latter member and the operating means for the former member, and means to render said connections inoperative when the market-indicator member registers less than the maximum indicator member, and to render said connections operative when the two members register alike.

24. In a device of the class described, an indicator for displaying tens digits, an indicator for displaying units digits, separate means for operating each of said indicators, and means to upset the registration of the units-indicator when the tens-indicator is advanced.

25. In a device of the class described, an indicator for displaying units digits, an indicator for displaying fractions, separate means for operating said indicators and means to upset the registration of the fractions-indicator wheels when the units-indicator is advanced.

26. In a device of the class described, a tens-indicator a units-indicator and a fractions-indicator, separate means for operating each of said indicators, and means to upset the registration of both the fractions- and units-indicators when the tens-wheel is advanced.

27. In a device of the class described, an indicating mechanism for each security or commodity, operating means therefor, a printing telegraph mechanism, and a selecting mechanism interposed between the printing telegraph mechanism and the various indicating mechanisms to render operative an indicating mechanism corresponding to the security or commodity recorded by the printing telegraph.

28. In a device of the class described, a plurality of indicators, a pneumatic indicator-operating mechanism for each indicator, a printing telegraph machine, and a selecting mechanism interposed between the printing telegraph and the various indicator-operating mechanisms to render operative a predetermined indicator-operating mechanism.

29. In a device of the class described, an indicating mechanism for each security, operating means therefor, a printing telegraph mechanism, and a pneumatic selecting mechanism interposed between the printing telegraph mechanism and the various indicator-operating mechanisms to render operative that indicator-operating mechanism corresponding to the security recorded by the printing telegraph.

30. In a device of the class described, an indicating mechanism for each security or commodity, pneumatic operating means therefor, a printing telegraph mechanism, and an electrically-controlled selecting mechanism interposed between the printing telegraph mechanism and the various indicating mechanisms to render operative the particular indicating mechanism corresponding to the security or commodity recorded by the printing telegraph.

31. In a device of the class described, an indicating mechanism for each security or commodity, operating means therefor, a printing telegraph instrument, and an electrically controlled selecting mechanism interposed between the printing telegraph mechanism and the various indicating mechanisms to render operative the particular indicating mechanism corresponding to the security or commodity recorded by the printing telegraph, said selecting mechanism including a circuit for each letter of the alphabet.

32. In a device of the class described, a plurality of indicators, one for each of several stocks or commodities to be quoted in tabulated form, a selective device comprising a plurality of initial selectors, a plurality of additional selectors, and independent means to operate each of said selectors, means to give a different indicator selection for each combination of an initial selector coöperating with an additional selector, and means common to all the indicators whereby the latter are actuated when rendered operative by said selectors.

33. In a device of the class described, a plurality of indicators for quoting stocks or commodities, an initial and an additional selector adapted by successive actuation to coöperate with one another and thereby select an indicator, an indicator controller for each indicator, each controller adapted to be differently actuated for displaying correspondingly different quotations, and means to operatively connect each controller with its indicator when the latter is selected by the coöperation of said initial and additional selectors.

34. In a device of the class described, a plurality of indicating mechanisms, a selecting mechanism comprising a plurality of contacts, one for each letter of the alphabet, a pair of circuits for each contact, automatic means to connect the circuits of each pair alternately to the corresponding contacts, a magnet in each circuit, and means controlled by a combination of said magnets to render operative a selected indicating mechanism.

35. In a device of the class described, a plurality of indicating mechanisms, a selecting mechanism comprising a plurality of contacts, one for each letter of the alphabet, a pair of circuits for each contact, automatic means to connect the circuits of each pair alternately to the corresponding contacts, a magnet in each circuit, pneumatic means controlled by a combination of said magnets to render operative a selected indicating mechanism, and means to operate said selected indicating mechanism.

36. In a device of the class described, a plurality of indicating mechanisms, each adapted to indicate the digits, a contact for each digit, two circuits for each contact, automatic means to connect each circuit of a pair alternately to its contact, and means governed by the impulses sent through the circuits to operate any one of the indicating mechanisms.

37. In a device of the class described, a plurality of indicating mechanisms, each adapted to indicate predetermined fractions, a contact for each fraction to be indicated, a circuit for each contact, and means governed by impulses sent through the circuits to operate any one of the indicating mechanisms, and selective means to prevent the operation of the others.

38. In a device of the class described, a plurality of indicating mechanisms, a pair of pneumatics for controlling the operation of each indicating mechanism, and electrical mechanism operated by a printing telegraph to render operative that pair of pneumatics corresponding to the security or commodity printed by the printing telegraph.

39. In a device of the class described, a plurality of indicating mechanisms, a pair of pneumatics for each indicating mechanism, means governed by each pair of pneumatics to render the corresponding indicating mechanism operative, and electro-pneumatic means to actuate any pair of pneumatics.

40. In a device of the class described, an indicator, setting devices to set the indicator, and a plurality of pneumatics adapted to act on said setting devices, each pneumatic operating to give the setting device a different movement.

41. In a device of the class described, an indicator, a setting device to set the same, a plurality of pneumatics adapted to act separately on said setting device, and means to limit the movement of each pneumatic.

42. In a device of the class described, a plurality of contacts, a pair of electric circuits for each contact, an automatic switch controlling the connection of said circuits with said contacts, another contact, an electric circuit connected therewith, a magnet interposed in said circuit, and means controlled by said magnet for operating said switch.

43. In a device of the class described, an indicator for quoting stocks or commodities, an initial and an additional selector, an electro-responsive indicator-setting device normally responsive without influencing said indicator but operatively connected with the latter for setting the same when selected by the coöperation of said initial and additional selectors.

44. In a device of the class described, an indicating mechanism for each of a plurality of stocks or commodities, operating means therefor, and a selecting mechanism comprising a plurality of group selectors each adapted to be individually actuated to collectively select a group of said indicating mechanisms and means to render controllable only that one indicating mechanism which is common to the respective groups of a plurality of actuated selectors.

45. In a device of the class described, a plurality of independently-actuated selector units, a group of indicator units collectively controlled by each selector unit, each indicator unit being common to the groups of more than one selector unit, an actuating mechanism common to all the indicator units, and means for coördinating the control of a plurality of selector units for the purpose of placing any desired indicator unit in operative connection with said actuating mechanism.

46. In an automatic stock-quotation board, the combination with suitable controlling devices, of an electric switch, an electro-pneumatic action, a power pneumatic operatively connected therewith, a latch arm attached to said power pneumatic, a movable member adapted to engage with said latch-arm when the latter is thrown out of its normal position, said movable member being actuated by said latch-arm when the latter is returned to its normal position and said movable member being operatively connected to said electric switch.

47. In an automatic stock quotation board, the combination with suitable controlling devices, of an electro-pneumatic action, a power-pneumatic operatively connected therewith, a releasing member attached to said power pneumatic, a second power-pneumatic, a pneumatic action and controlling device therefor, a latch arm attached to said second power-pneumatic, a movable member operatively connected to an electric switch, and springs adapted to throw said movable member and said latch arm into their normal positions respectively, said latch arm being adapted to engage the said movable member and to be disengaged therefrom by said releasing member.

48. In a device of the class described, a plurality of quotation-indicators, selecting and actuating devices therefor, a printing telegraph adapted to control automatically said selecting and actuating devices, and an electric switch operated by said printing telegraph and adapted to connect said selecting and actuating devices with and disconnect the same from said printing telegraph.

49. In an automatic stock-quotation board, an electric switch means for opening and closing the same, comprising an electro-pneumatic action, a power pneumatic operated thereby, a switch-arm, a reversibly operating actuating device therefor operatively connected to said power-pneumatic, and adapted when operated by said power pneumatic to open said switch when closed, and to close the same when opened.

50. In a device of the class described, the combination with a printing telegraph and quotation-indicators, automatically operated by means of said printing telegraph, of a quotation indicator housing comprising a front-board having openings therein through which the quotations of said indicators may be displayed and having spaces thereon for the names or abbreviations of the several securities or commodities quoted, and spaces for posting manually any quotations or other data.

51. In a device of the class described, an intelligence transmitting instrumentality, a plurality of indicating members each adjustable to display in one place at different times various numbers, and selective means and setting devices each controlled by a single electrical impulse initiated by said intelligence transmitting instrumentality whereby any desired indicating member is selected for adjustment and brought to an indication of any desired number.

52. In a device of the class described, a plurality of quotation indicators each comprising a set of indicating members, a plurality of coöperative selector units, means to actuate said units in various combinations, and mechanism controlled by the selector units and adapted to cause any one of said indicators to display any desired succession of quotations.

53. In a device of the class described, a plurality of indicating devices, an operating mechanism for each indicating device, a sending station electrically connected with all the operating mechanisms, selective means to render operative any one of the operating mechanisms from the sending station and further selective means to cause the indicating devices to display any desired combination of digits or fractions or both.

54. In a device of the class described, a printing-telegraph, a market-quotation indicator, and means rendered operative, by said printing telegraph to actuate said indicator to indicate a quotation.

55. In a device of the class described, a printing telegraph instrument, a plurality of indicating members to indicate a stock-market quotation, and operating means therefor electrically controlled by said printing telegraph instrument.

56. In a device of the class described, an indicator comprising a plurality of indicating members, one for indicating the tens digit of a number, one for indicating the units digit, and one for indicating fractions, means to operate said members separately, a printing telegraph instrument, and electrical connections between said instrument and said means whereby the latter are operated from the former.

57. In a device of the class described, a plurality of indicators, an indicator-operating mechanism for each indicator, a printing telegraph machine, and a selecting mechanism interposed between the printing telegraph and the various indicator-operating mechanisms to render operative a predetermined indicator-operating mechanism.

58. In a device of the class described, an indicating mechanism for each security, operating means therefor, a printing telegraph mechanism, and a selecting mechanism interposed between the printing telegraph mechanism and the various indicator-operating mechanisms to render operative that indicator-operating mechanism corresponding to the security recorded by the printing telegraph.

59. In a device of the class described, an indicating mechanism for each security or commodity, operating means therefor, a printing telegraph mechanism, and an electrically-controlled selecting mechanism interposed between the printing telegraph mechanism and the various indicating mechanisms to render operative the particular indicating mechanism corresponding to the security or commodity recorded by the printing telegraph.

60. In a device of the class described, means to transmit a series of quotations from one point to another, a maximum quotation indicator comprising separate indicating units for the several places of digits and fractions of a quotation, actuating mechanism for said indicating units comprising connections with said quotation transmitting means for causing said maximum quotation indicator unit to be responsive to and indicative of the transmission of maximum quotations while being irresponsive to all other transmitted quotations.

61. In a device of the class described, intelligence-transmitting mechanism to transmit from one point to another a succession of quotations, a minimum quotation indicator comprising separate indicating units for the several places of digits and fractions of a quotation actuating mechanism for said indicating units comprising connections with said intelligence-transmitting mechanism for causing said minimum quotation indicating units to be responsive to and indicative of the transmission of market quotations only when the latter are also minimum quotations.

62. In a device of the class described, a plurality of selector units, a plurality of indicator units, means to select any desired indicator unit by the coöperation of a plurality of selector units, means to employ a single electrical impulse to initiate any desired setting for said indicator unit and motive power to complete said setting.

63. In a device of the class described, an indicating member, means rendered operative by a single electrical impulse to actuate a controller whereby said indicating member is caused to make any one of a number of indications motive power for completing said setting movement, and a plurality of selector units adapted to operate in various combinations for the purpose of rendering said indicating member either subject to or free from said controller, depending on the indication to be made.

64. In a device of the class described, a plurality of sets of indicator units, each set having a unit for each digit or fraction comprised in a quotation and said sets constituting market, maximum and minimum indicators, means to actuate successively the indicator units of each set, and means to render the maximum and minimum indicator sets operative only when the quotation to be indicated is a maximum or minimum quotation.

In testimony whereof, I have signed my name to this specification, in the presence of two subscribing witnesses.

RALPH W. BUMSTEAD.

Witnesses:
 GEO. W. GREGORY,
 ELIZABETH R. MORRISON.